3,133,901
AMINONORBORNANES AND THEIR
PREPARATION
George I. Poos, Ambler, Pa., assignor to McNeil Laboratories, Incorporated, a corporation of Pennsylvania
No Drawing. Filed Aug. 11, 1960, Ser. No. 48,830
9 Claims. (Cl. 260—558)

This invention relates to a new series of organic compounds. More particularly, the invention relates to aryl norbornenes, the corresponding norbornanes and methods for their preparation.

The compounds of this invention may be defined by the following general structural formula:

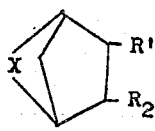

$X$ = ethylene, vinylene.
$R'$ = COAr, —CHOHA·, —COH(Ar)$_2$, =C(Ar)$_2$, —CH(Ar)$_2$.
$R_2$ = CON(Y)$_2$, —CH$_2$N(Y)$_2$.
$Y$ = N,N di-lower hydrocarbonamino, the lower hydrocarbon function being a saturated or unsaturated, cyclic, straight or branched-chain alkyl group; or an N,N-lower alkylene amino group, the alkylene chain of which contains from 4 to 6 carbon atoms, which are in the form of a straight carbon chain or interrupted by one or more hetero atoms such as oxygen, sulfur or nitrogen, thus forming a lower oxa-, thia- or aza-alkylene radical and which, when taken together with the nitrogen atom, may form, for example, a piperidino, pyrrolidino, hexamethyleneimino, morpholino, thiamorpholino or piperazino radical.
$Ar$ = phenyl or substituted phenyl, i.e., wherein the phenyl ring includes one or more additional substituents such as lower alkyl, lower alkoxy, halo or amino.

As used herein, the lower hydrocarbon function is intended to include lower alkyl radicals in chains from 1 to 7 carbon atoms, e.g., methyl, ethyl, propyl, isopropyl, butyl, isobutyl, pentyl, isopentyl, etc.; lower alkoxy is intended to include methoxy, ethoxy, propoxy, butoxy, pentoxy, etc.; halo is intended to mean chloro, fluoro, bromo and iodo.

Acid addition salts of the compounds of this invention are those obtainable by reaction with organic or inorganic acids and yielding therapeutically active compounds as for example hydrohalic acids such as hydrochloric, hydrobromic or hydriodic acid; sulfuric, nitric, phosphoric, acetic, propionic, glycolic, lactic, pyruvic, oxalic, malonic, succinic, maleic, fumaric, malic, tartaric, citric, benzoic, cinnamic, mandelic, methanesulfonic, ethanesulfonic, salicylic, p-aminosalicylic, 2-phenoxybenzoic and 2-acetoxybenzoic acid.

Quaternary ammonium compounds of this invention having the above general formula are lower alko halides such as methiodides, ethobromides or propochlorides; lower alkeno halides such as allyl bromides; lower alko sulfates such as dimethosulfates or diethosulfates, and the corresponding hydroxides.

The substituent groups on the claimed norbornene (ane) nuclei may be spatially related in what is known as "exo" or "endo" positions in three-dimensional representation. It is to be understood, however, that the novel compounds, as generically described and claimed, are intended to embrace both these configurations. The specific illustrations given are not to be considered as limitations upon the scope of the invention or as restrictive exemplifications of "exo" or "endo" configurations of a given compound.

The novel compounds of this invention possess antihistamine, antiserotinin and anticholinergic activities as well as ganglionic blocking action. They are also useful as mild central nervous system stimulants.

The novel compounds may be prepared by reacting the appropriate norbornene (or norbornane) carboxylic acid with the desired amine in the presence of an alkyl haloformate, an acid acceptor and an organic solvent to give the corresponding dialkylamide. This compound, if desired, may be reduced to the corresponding amino alcohol which, in turn, may be oxidized with chromic anhydride-pyridine to the amino ketone. The latter, by reaction with aryl magnesium halides such as phenyl magnesium bromide, para-tolyl magnesium chloride, ortho tolyl magnesium bromide or with aryl lithium compounds such as phenyl lithium or ortho tolyl lithium, may be converted to the amino alkyl norbornyldiarylalkanol.

Suitable amines for reaction with the norbornene carboxylic acid are the secondary amines, symmetrical or unsymmetrical, including dimethylamine, diethylamine, dipropylamine, diallylamine, methylethylamine, dibenzylamine, diphenylamine, pyrrolidine, morpholine, piperidine, methylaniline. Acid acceptors which may be employed include tertiary amines such as triethylamine, trimethylamine, dimethylaniline, N-methyl piperidine, pyridine, etc.

Any one of a wide variety of organic solvents may be used for the alkyl haloformate or the organic metallic reaction, as for example benzene, xylene, hexane, heptane, chloroform, carbon tetrachloride, chlorobenzene, diethyl, ether, dioxane, tetrahydrofurane or, preferably, toluene.

Conversion of the keto amide to the amino alcohol is accomplished by the reduction with a di-light metal hydride such as sodium aluminum hydride or, preferably, lithium aluminum hydride. Alternatively, the reduction may be carried out with catalytically activated hydrogen; hydrogen in statu nascendi or with sodium or aluminum amalgam. As reaction solvents, there may be employed hydrocarbon solvents, halogenated hydrocarbons, ethers, etc., as for example, benzene, toluene, xylene, hexane, heptane, chloroform, carbon tetrachloride, chlorobenzene, diethylether, dioxane, diethyleneglycol, dimethylether or, preferably, tetrahydrofuran.

It will be understood that the norbornane series of novel compounds may be prepared either by employing the unsaturated starting material and proceeding through the necessary conversions or, alternatively, by starting with the unsaturated form and hydrogenating as desired. Hydrogenation is done by treating the unsaturated compound with hydrogen in the presence of a catalyst selected from the metals of the eighth group of the periodic system such as nickel, palladium, platinum, ruthenium or rhodium, which may be supported on a carrier such as barium carbonate or charcoal. Reduction of this nature is conducted in the presence of a solvent such as a lower alkanol for example, methanol or ethanol.

Depending upon the conditions employed during the course of the reaction, the novel compounds are obtained either in the form of the free bases or salts thereof. The salts are converted to the free bases in the usual manner, e.g., by reaction with alkali such as sodium or potassium hydroxide. The bases can be converted to their therapeutically useful acid addition salts by reaction with an appropriate organic or inorganic acid.

The novel compounds may be converted into the corresponding quaternary ammonium compounds by reaction of the tertiary bases with alkylating agents, i.e., alkyl or aralkyl halides or esters formed by reacting alkanols with an oxygen-containing acid such as methyl iodide, ethyl bromide, propyl chloride; lower alkenyl halides—allyl bromide; di-lower alkyl—sulfates—dimethyl sulfate, diethyl sulfate; lower alkyl arylsulfonates—methyl p-toluolsulfonate or aralkyl halides—benzyl chloride. The quaternizing reaction may be performed in the presence or absence of a solvent, at room temperature or under cooling, at atmospheric pressure or in a closed vessel under pressure. Suitable solvents for this purpose are lower alkanols such as ethanol, propanol, or butanol; or organic acid amides such as formamide or dimethylformamide. When lower alkyl halogenides are used as quaternizing agents, formamide and dimethylformamide are the preferred solvents and the reaction is advantageously run in a closed vessel under pressure, the latter being built up by heating.

The resulting quaternary ammonium compounds may be converted into the corresponding quaternary ammonium hydroxides. This may be accomplished by reaction of the quaternary ammonium halides with silver oxide, by reaction of the sulfates with barium hydroxide, by treating the quaternary salts with an anion exchanger or by electrodialysis. Quaternary ammonium salts may be prepared from the resulting base by reaction with acids such as those mentioned hereinabove for the preparation of the acid addition salts or, if desired, with a mono-lower alkyl sulfate such as methyl sulfate or ethyl sulfate. The quaternary ammonium compound may also be converted into another quaternary salt directly without conversion into the quaternary ammonium hydroxide. Thus, a quaternary ammonium iodide may be reacted with freshly prepared silver chloride to yield the quaternary ammonium chloride, or the quaternary ammonium iodide may be converted into the corresponding chloride by treatment with hydrochloric acid in anhydrous methanol.

The following examples are intended to illustrate, but not to limit, the scope of the present invention.

*Example I*

248.1 parts by weight of β-benzoylacrylic acid is dissolved in 1200 parts by volume of benzene with warming, and 103 parts by weight of freshly distilled cyclopentadiene is added while stirring. The reaction mixture is stirred overnight at room temperature and then concentrated to dryness. The product, melting point 102–134° C., a mixture of exo-3-benzoyl-5-norbornene-endo-2-carboxylic acid and endo-3-benzoyl-5-norbornene-exo-2-carboxylic acid, is crystallized from ether-petroleum ether.

The mixture of acids is separated by iodolactonization. A solution of 27.44 parts by weight of total crystalline product from a Diels-Alder reaction in 686 parts by volume of 0.5 N sodium bicarbonate is combined with 59.3 parts by weight of iodine in 115 parts by weight of potassium iodide in 345 parts by volume of water and stored overnight at room temperature in the dark. The mixture is extracted three times with methylene chloride, which is washed with sodium thiosulfate solution and water and dried over magnesium sulfate. Removal of the solvent left 22.3 parts by weight of brown solid, which, after decolorizing carbon treatment, is crystallized from methylene chloride-ether, yielding the iodolactone, exo-3-benzoyl - 6 - hydroxy - 5 - iodo - endo - 2 - norcamphanecarboxylic acid gamma-lactone, which is 20.0 parts by weight, M.P. 154–156° C.

The above sodium bicarbonate layer, containing the iodohydrin 3-benzoyl-5(or 6)-hydroxy-6(or 5)-iodo-norcamphane-2-carboxylic acid is decolorized with sodium thiosulfate and acidified with 2 N hydrochloric acid. The gummy precipitate is extracted with methylene chloride, which after drying over magnesium sulfate gives 22.7 parts by weight of a buff colored solid. This is crystallized from methylene chloride-petroleum ether, M.P. 169–182° C. (dec.).

Reduction of the iodolactone, exo-3-benzoyl-6-hydroxy-5-iodo-2-endo-2-norcamphanecarboxylic acid gamma-lactone, back to the endo-acid, exo-3-benzoyl-5-norbornene-endo-2-carboxylic acid, is accomplished by heating a mixture of 88.9 parts by weight of exo-3-benzoyl-6 - hydroxy - 5 - iodo - 2 - endo - 2 - norcamphanecarboxylic acid gamma-lactone, and 157 parts by weight of zinc dust in 2000 parts by volume of ethanol under reflux for two hours while stirring. The inorganic material is removed by filtration and the solvent is removed under reduced pressure. The residue is taken up in ether and washed well with 2 N hydrochloric acid and water. The ether layer is dried over magnesium sulfate and the solvent is removed under reduced pressure. After decolorization, the residue is crystallized from methylene chloride-ether-petroleum ether, giving 52.1 parts by weight of exo-3-benzoyl-5-norbornene-endo-2-carboxylic acid, M.P. 138.5–142.5° C.

Reduction of 2.0 parts by weight of iodohydrin, 3-benzoyl - 5(or 6) - hydroxy - 6(or 5) - iodo - nor - camphane-2-carboxylic acid by reflux with 3.60 parts by weight of zinc dust in 40 parts by volume of ethanol is complete in four hours. The crystalline exo-acid endo-3-benzoyl-5-norbornene-exo-2-carboxylic acid is isolated as above in 75.5% yield, 0.95 parts by weight, M.P. 127–128° C.

*Example II*

A suspension of 47.4 parts by weight of exo-3-benzoyl-5-norbornene-endo-2-carboxylic acid in 300 parts by volume of dry toluene is cooled to −5° C., and 21.8 parts by weight of triethylamine is added. To the resulting solution, 23.4 parts by weight of ethyl chloroformate in 100 parts by volume of dry toluene is added dropwise over thirty minutes with stirring at −5° C. to 0° C. The suspension is stirred at 0° C. for two and one-quarter hours. A solution of 9.75 parts by weight of dimethylamine in cold toluene is added rapidly. The suspension is stirred at room temperature for eighteen hours, and the organic layer is washed with water, 2 N hydrochloric acid, water, 5% sodium bicarbonate, and water. The aqueous washes, at pH 8, are back-extracted with ether and similarly washed. The combined ethereal extracts are dried and concentrated, and the product is crystallized from ether-petroleum ether giving exo-3-benzoyl-N,N-dimethyl-5-norbornene-endo-2 - carboxamide, M.P. 91–95° C.

*Example III*

A solution of 23.7 parts by weight of exo-3-benzoyl-N,N-dimethyl-5-norbornene-endo-2-carboxamide in 100 parts by volume of dry tetrahydrofuran is added slowly to a suspension of 10.0 parts by weight of lithium aluminum hydride in 300 parts by volume of dry tetrahydrofuran. The mixture is refluxed for twenty hours, cooled in an ice-bath, and decomposed slowly with 30 parts by volume of water. The mixture is stirred for four and one-half hours at room temperature, and the precipitate is removed by filtration. The filtrate is concentrated and the residue crystallized from methylene chloride-ether-petroleum ether to give endo-3-dimethylaminomethyl-5-norbornene-2-yl exo-phenylmethanol, M.P. 118–125° C.

*Example IV*

Pyridine, 200 parts by volume, is cooled in an ice-bath and 13.3 parts by weight of chromic oxide is added in portions with thorough mixing. To the resulting complex is added a solution of 13.32 parts by weight of amino alcohol, endo - 3-dimethylaminomethyl-5-norbornene-2-yl exo-phenylmethanol, in 80 parts by volume of pyridine. The resulting dark mixture is allowed to stand at room temperature for twenty-two hours and then is treated with 280 parts by volume of water. This mixture is extracted three times with ether, washing each ether extract with a small portion of water, which is added to the pyridine-water reaction mixture. The combined ethereal extracts are dried over magnesium sulfate and concentrated to dryness, finally with pumping under high vacuum, to give endo-3-dimethylaminomethyl-5-norbornene-2-yl exo-phenyl ketone.

The hydrogen fumarate prepared from 3.39 parts by weight of endo-3-dimethylaminomethyl-5-norbornene-2-yl exo phenyl ketone and 1.54 parts by weight of fumaric acid in isopropyl alcohol-ether mounted to 3.67 parts by weight, M.P. 144–146° C.

Example V

A solution of phenyl lithium is prepared by adding in portions under nitrogen 2.88 parts by weight of lithium wire to a mixture of 32.8 parts by weight of bromobenzene in 100 parts by volume of anhydrous ether. The mixture is stirred with a Hershberg stirrer until the reaction is complete. At the same time, the pure amino ketone endo-3-dimethylaminomethyl-5-norbornene-2-yl exo-phenyl ketone is isolated by dissolving its fumarate in water, making the solution strongly basic with sodium hydroxide, extraction with ether, washing, drying and concentration. A solution of 26.6 parts by weight of endo-3-dimethylaminomethyl-5-norbornene-2-yl exo-phenyl ketone in 100 parts by volume of anhydrous ether is then added at a rate to maintain reflux (fifteen minutes) to the phenyl lithium solution. The resulting reaction mixture is stirred at room temperature overnight and hydrolyzed by adding 33 parts by volume of water dropwise. When all of the solid is dissolved, the layers are separated and the aqueous part is extracted with ether. The combined ethereal solutions are washed with water, treated with charcoal, concentrated to dryness and the residue is dried by distilling benzene from it. The product is 33.4 parts by weight of endo-3-dimethylamino-methyl-α,α-diphenyl-5-norbornene-exo-2-methanol.

Combination of 10.12 parts by weight of this product with 3.54 parts by weight of fumaric acid in isopropyl alcohol leads to 9.13 parts by weight of the fumarate, M.P. 212–214° C.

Example VI

A solution of 5.67 parts by weight of the crude amino alcohol, endo-3-dimethylaminomethyl-α,α-diphenyl-5-norbornene-exo-2-methanol, from the previous experiment in 50 parts by volume of methanol is shaken under three atmospheres of hydrogen with 0.2 parts by weight of 10% palladium-on-carbon for three and one-half hours. The catalyst is removed by filtration and the filtrate is concentrated to dryness under vacuum. The residue is dissolved in ether and extracted into dilute hydrochloric acid; the aqueous layer is made basic and extracted with ether. After drying over magnesium sulfate, the ether solution is treated with decolorizing carbon, filtered and concentrated to dryness to give endo-3-dimethylaminomethyl-α,α-diphenylnorbornane-exo-2-methanol (5.13 parts by weight). From 0.26 part by weight of this base and 0.090 part by weight of fumaric acid in isopropyl alcohol-ether there is obtained 0.26 part by weight of the hydrogen fumarate, melting point 185–192° C. Recrystallization from methanol-isopropyl-alcohol-ether gives pure endo-3-dimethylaminomethyl-α,α-diphenylnorbornane-exo-2-methanol hydrogen fumarate, M.P. 191–192° C.

Example VII

A solution of o-tolyl lithium is prepared from 6.45 parts by weight of o-bromotoluene and 0.52 parts by weight of lithium in 20 parts by volume of ether. This is treated with a solution of 4.78 parts by weight of amino ketone, endo-3-dimethylaminomethyl-5-norbornene-2-yl exo-phenyl ketone, in 20 parts by volume of ether and worked up as described under the preparation of endo-3-dimethylaminomethyl-α,α-diphenyl-5-norbornene-exo-2-methanol. The product is 5.94 parts by weight of endo-3-dimethylaminomethyl-α-phenyl-α-o-tolyl-5-norbornene-exo-2-methanol.

From 3.16 parts by weight of this product and 1.06 parts by weight of fumaric acid in isopropyl alcohol-ether there is obtained 2.37 parts by weight (56%) of endo-3-dimethylaminomethyl-α-phenyl-α-o-tolyl-5-norbornene-exo-2-methanol hydrogen fumarate, M.P. 174–189° C.

Several recrystallizations of this material from isopropyl alcohol-ether give endo-3-dimethylaminomethyl-α-phenyl-α-o-tolyl-5-norbornene-exo-2-methanol hydrogen fumarate, M.P. 190.5–192.5° C. in about 50% recovery.

What is claimed is:
1. A compound of the formula:

wherein X is a member of the group consisting of ethylene and vinylene, $R^1$ is a member of the group consisting of —COAr, —CHOHAr, —COH(Ar)$_2$, =C(Ar)$_2$, $R_2$ is a member of the group consisting of —CON(Y)$_2$, —CH$_2$N(Y)$_2$, wherein Ar is a member of the group consisting of phenyl and tolyl, and Y stands for a member selected from the group consisting of methyl, ethyl, propyl, isopropyl, butyl, isobutyl, pentyl and isopentyl.

2. The compound exo-3-benzoyl-N,N-dimethyl-5-norbornene-endo-2-carboxamide.

3. The compound endo-3-dimethylaminomethyl-5-norbornene-2-yl exo-phenylmethanol.

4. The compound endo-3-dimethylaminomethyl-5-norbornene-2-yl exo-phenyl ketone.

5. The compound endo-3-dimethylaminomethyl-α,α-diphenyl-5-norbornene-exo-2-methanol.

6. The compound endo-3-dimethylaminomethyl-α,α-diphenyl-norbornane-exo-2-methanol.

7. The compound endo-3-dimethylaminomethyl-α-phenyl-α-o-tolyl-5-norbornene-exo-2-methanol.

8. The process which comprises treating a member of the group consisting of a norbornene carboxylic acid and the corresponding norbornane carboxylic acid with an amine selected from the group consisting of dimethylamine, diethylamine, dipropylamine, diallylamine, methylethylamine, dibenzylamine, diphenylamine, pyrrolidine, morpholine, piperidine and methylaniline in the presence of an alkyl haloformate, an acid acceptor selected from the group consisting of triethylamine, trimethylamine, dimethylaniline, N-methyl piperidine and pyridine and organic solvent to give the corresponding keto amide.

9. The process as set forth in claim 8 wherein the resulting ketoamide is further reduced to the amino-alcohol.

References Cited in the file of this patent

Wagner et al.: Syn. Org. Chem., Wiley, New York (1953) page 533.

Winternitz et al.: Chemical Abstracts, vol. 50 (1956) page 7067.

Nesmeyanov et al.: Chemical Abstracts, vol. 52 (1958) pages 7158–7159.